(12) United States Patent
Farmer

(10) Patent No.: US 6,236,355 B1
(45) Date of Patent: May 22, 2001

(54) FAST RECOVERY OF LOCK POINT INFORMATION FOR GPS RTK RECEIVER

(75) Inventor: Dominic G. Farmer, Milpitas, CA (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/236,192

(22) Filed: Jan. 23, 1999

(51) Int. Cl.[7] .............................. H04B 7/185; G01S 5/02
(52) U.S. Cl. ........................ 342/357.06; 342/357.02; 342/357.04; 342/357.12
(58) Field of Search .................... 342/357.02, 357.04, 342/357.06, 357.12

(56) References Cited

U.S. PATENT DOCUMENTS 5,781,152 * 7/1998 Renard et al. ...................... 375/208

* cited by examiner

*Primary Examiner*—Theodore M. Blum
(74) *Attorney, Agent, or Firm*—Boris G. Tankhilevich

(57) ABSTRACT

Methods and systems for resolving the lock point ambiguity for the GPS receiver are disclosed. The method involves generation of the absolute lock point data bit by the reference station receiver, transmission of the absolute data bit to the rover receiver, and comparison between the raw lock point data with the absolute lock point data bit in the rover receiver. The system employs the reference station receiver, the rover receiver, and the communication link.

13 Claims, 9 Drawing Sheets

Channel Baseband Processing (Carrier)

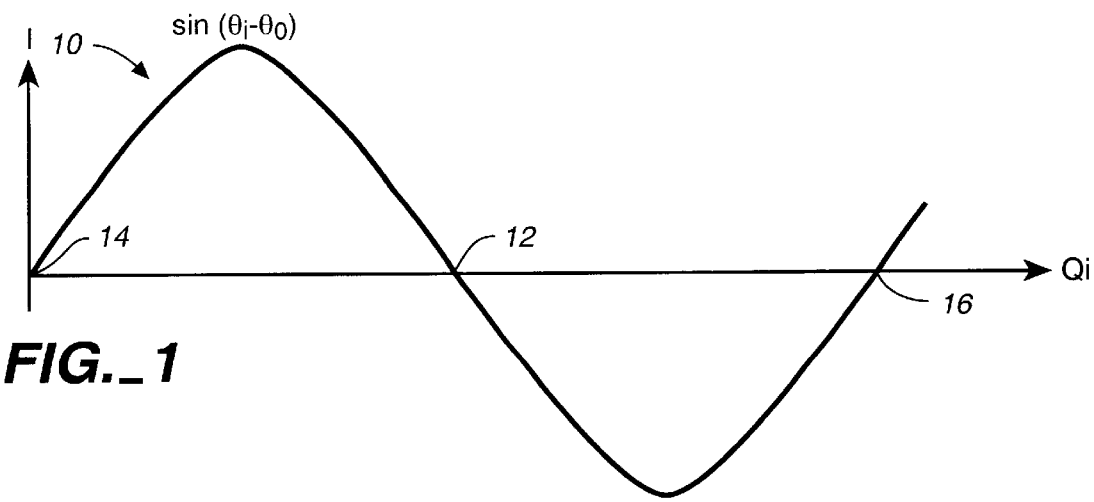
FIG._1
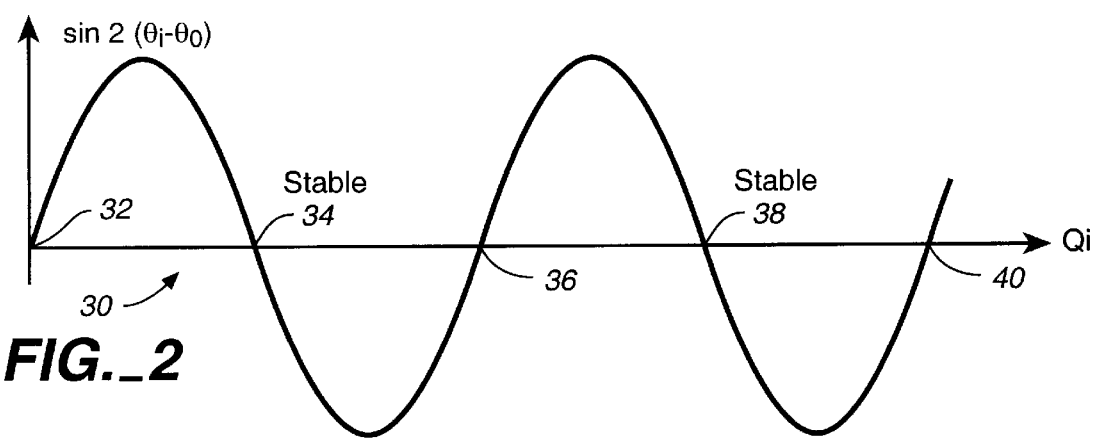
FIG._2
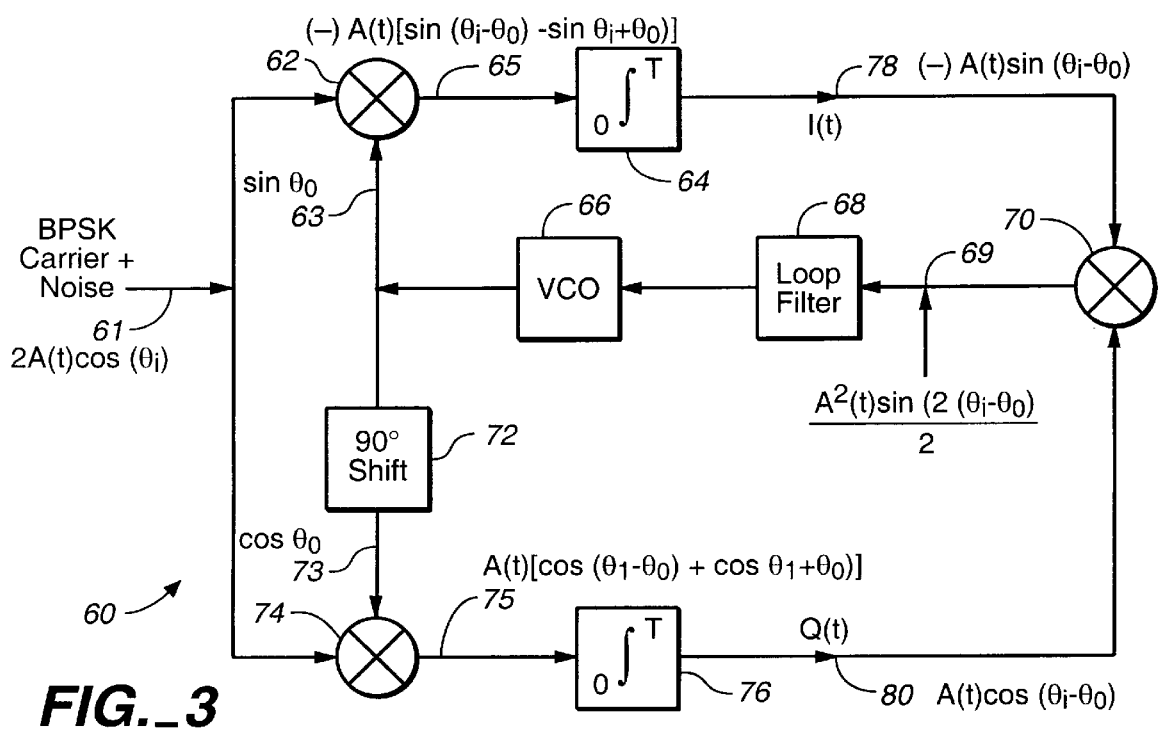
FIG._3

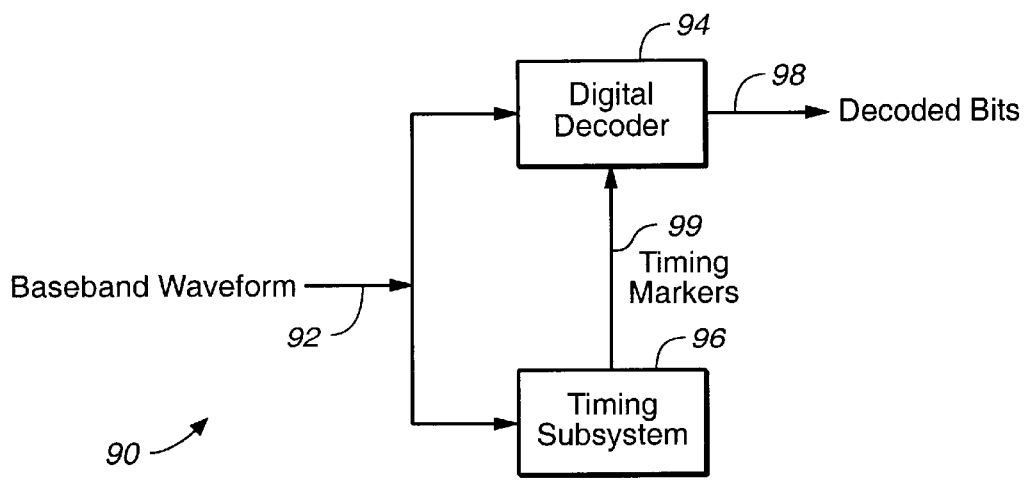
FIG._4
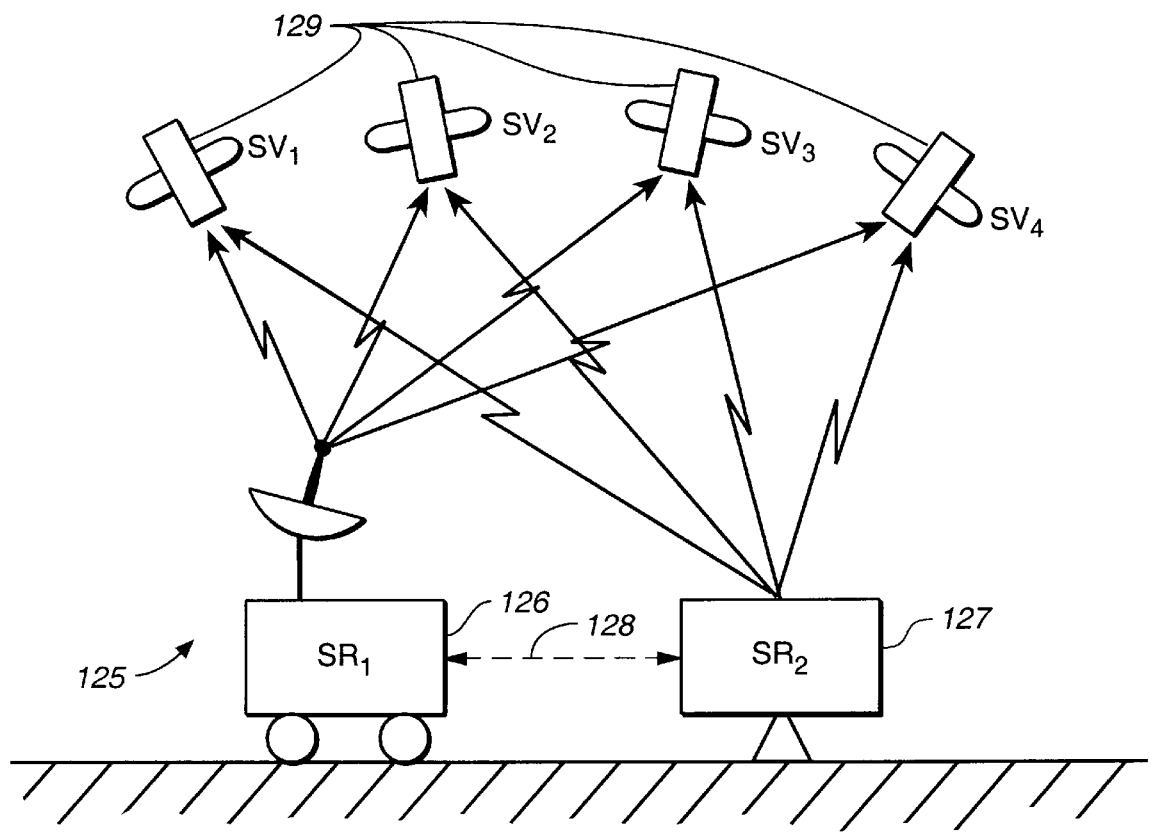
FIG._6

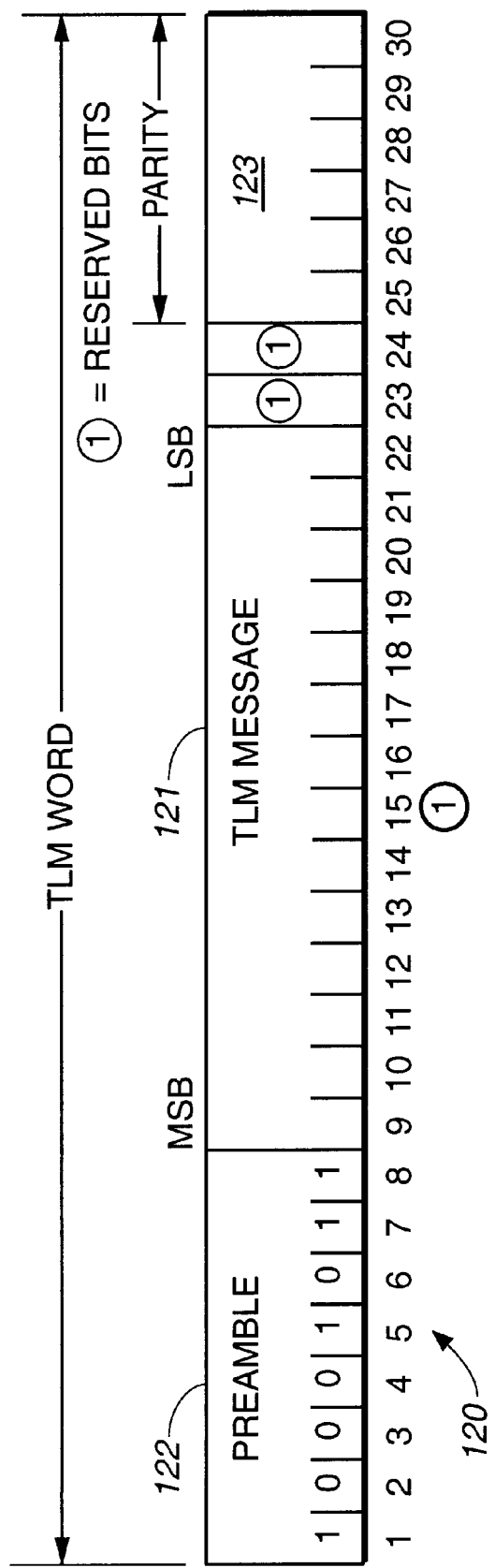
FIG._5

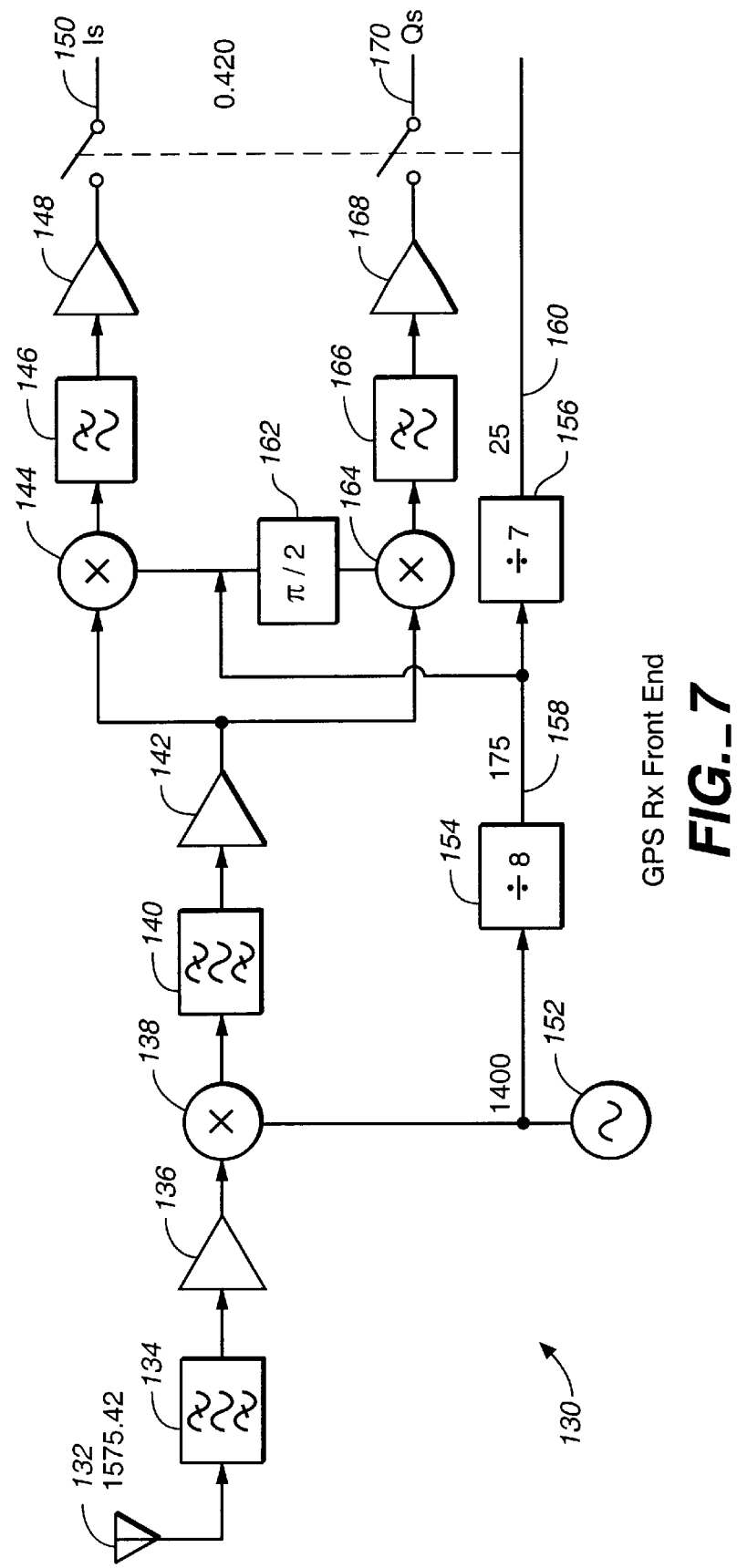
FIG._7
GPS Rx Front End

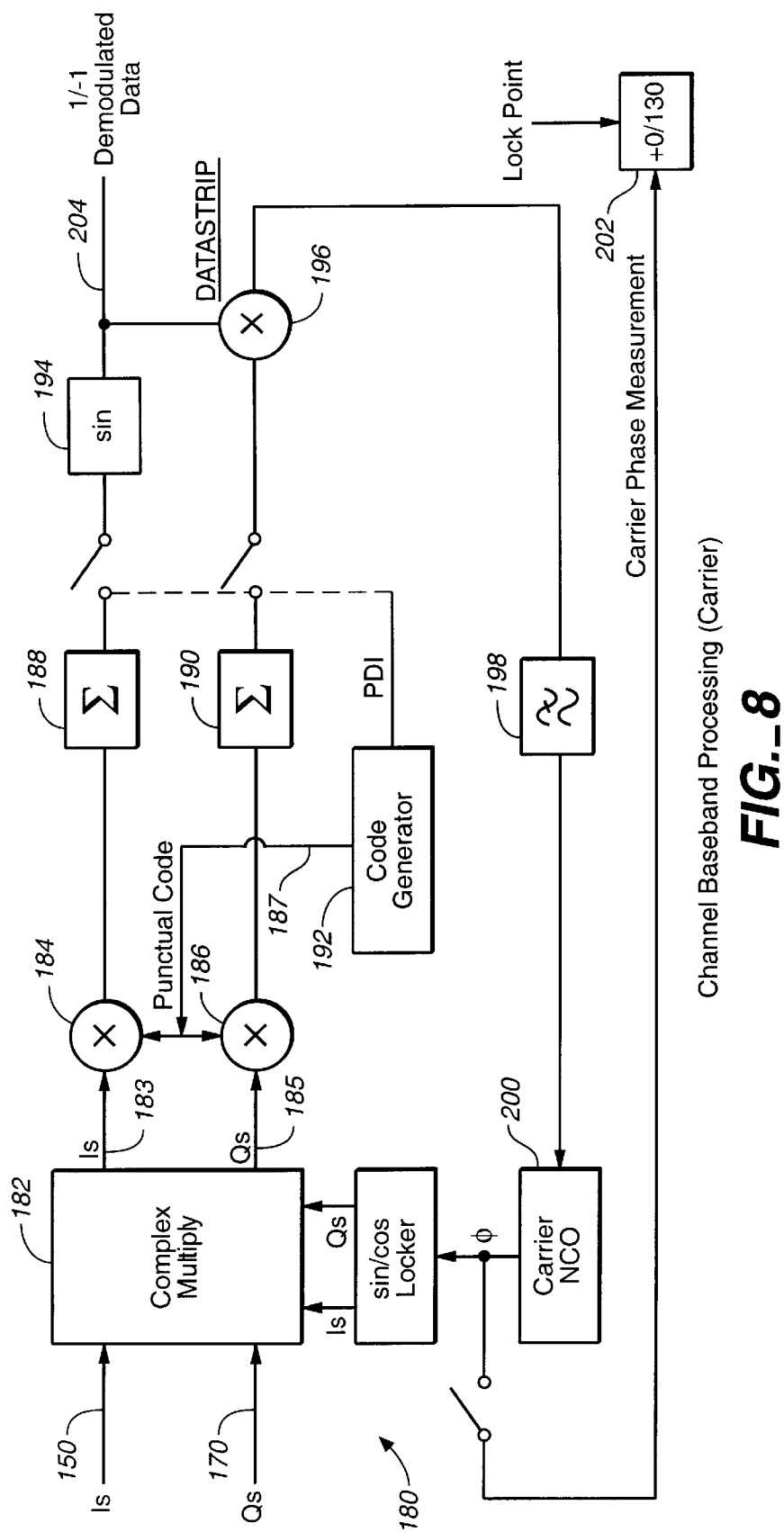
FIG._8

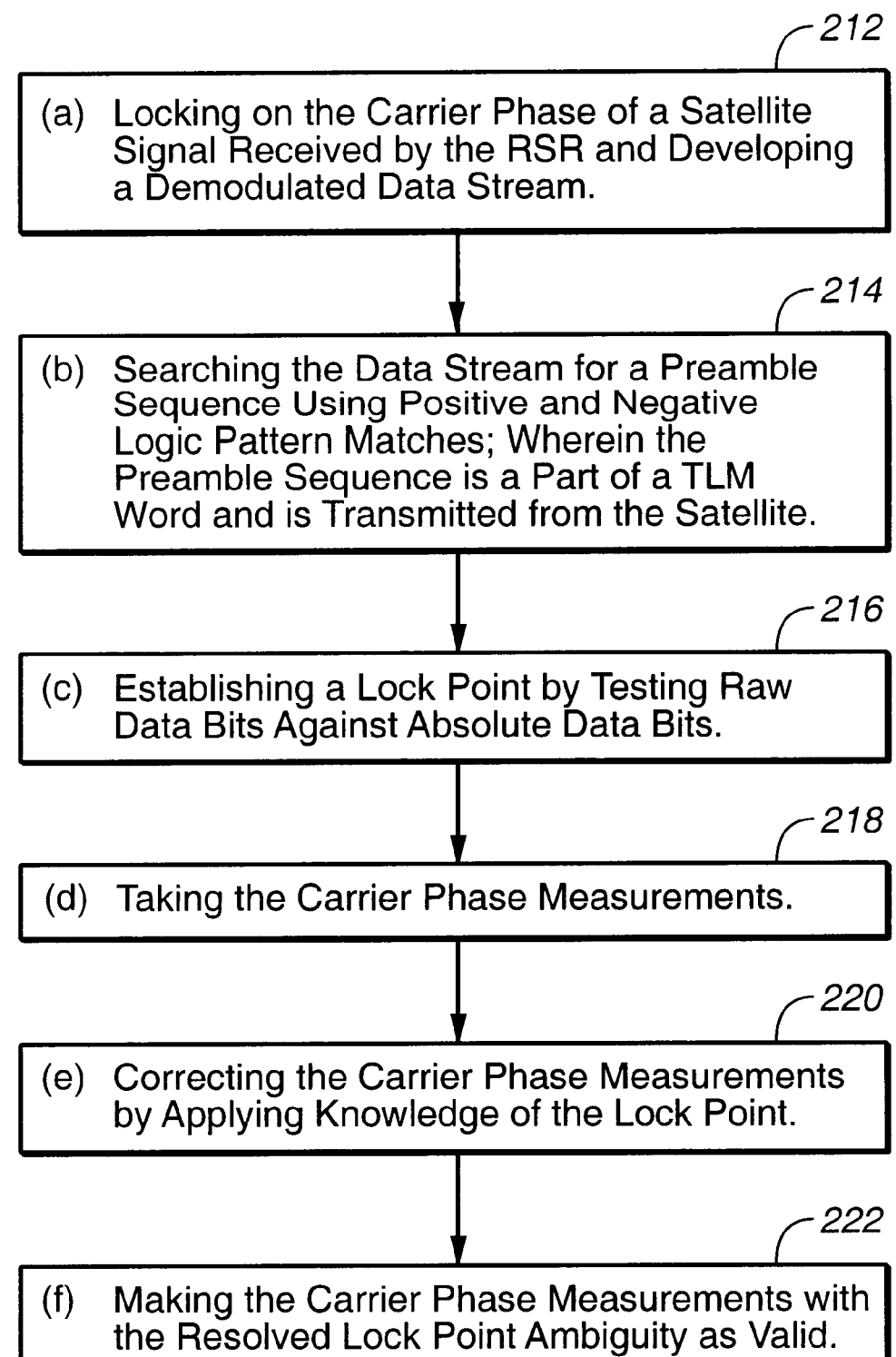
FIG._9

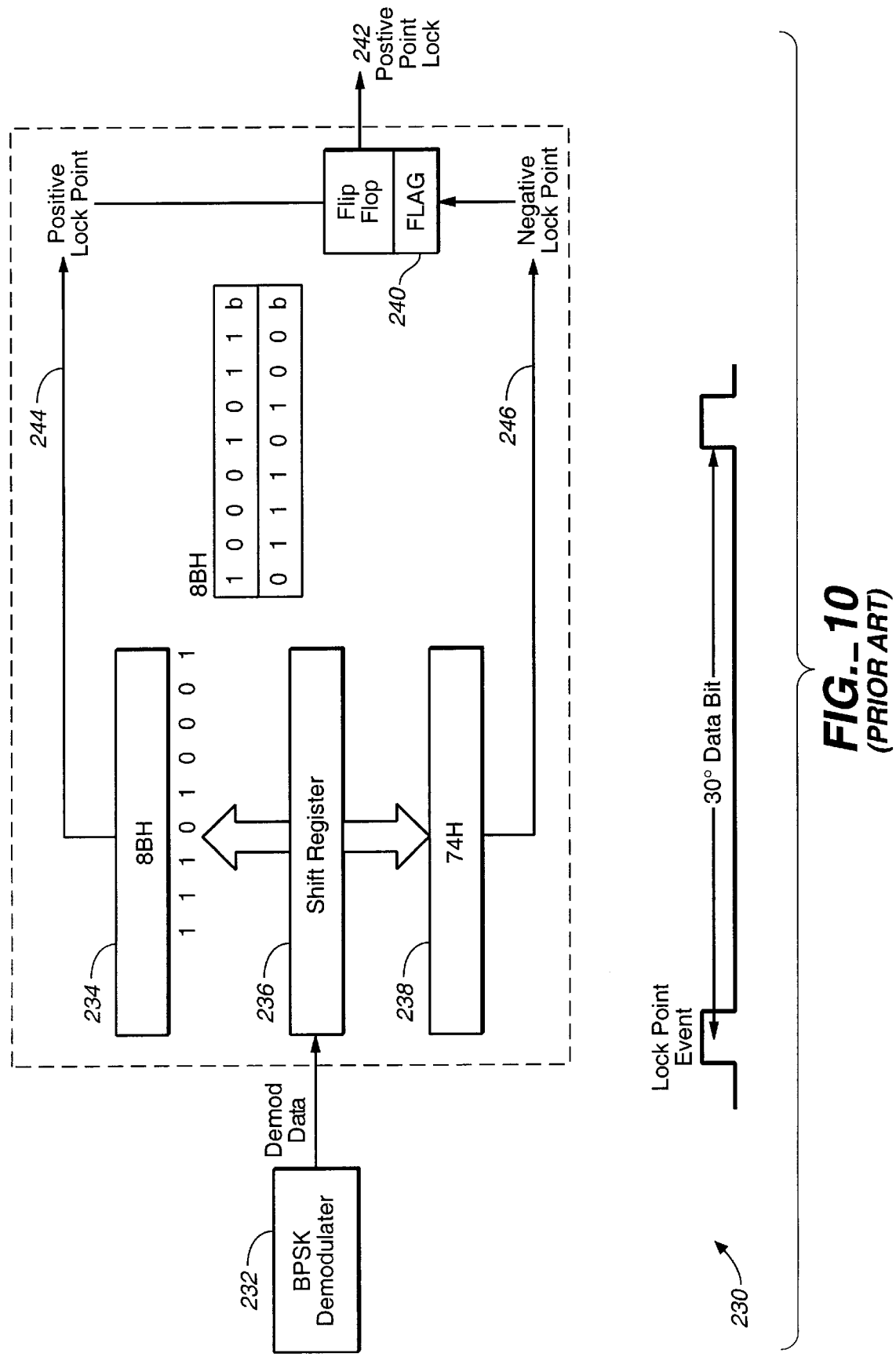
FIG._10
*(PRIOR ART)*

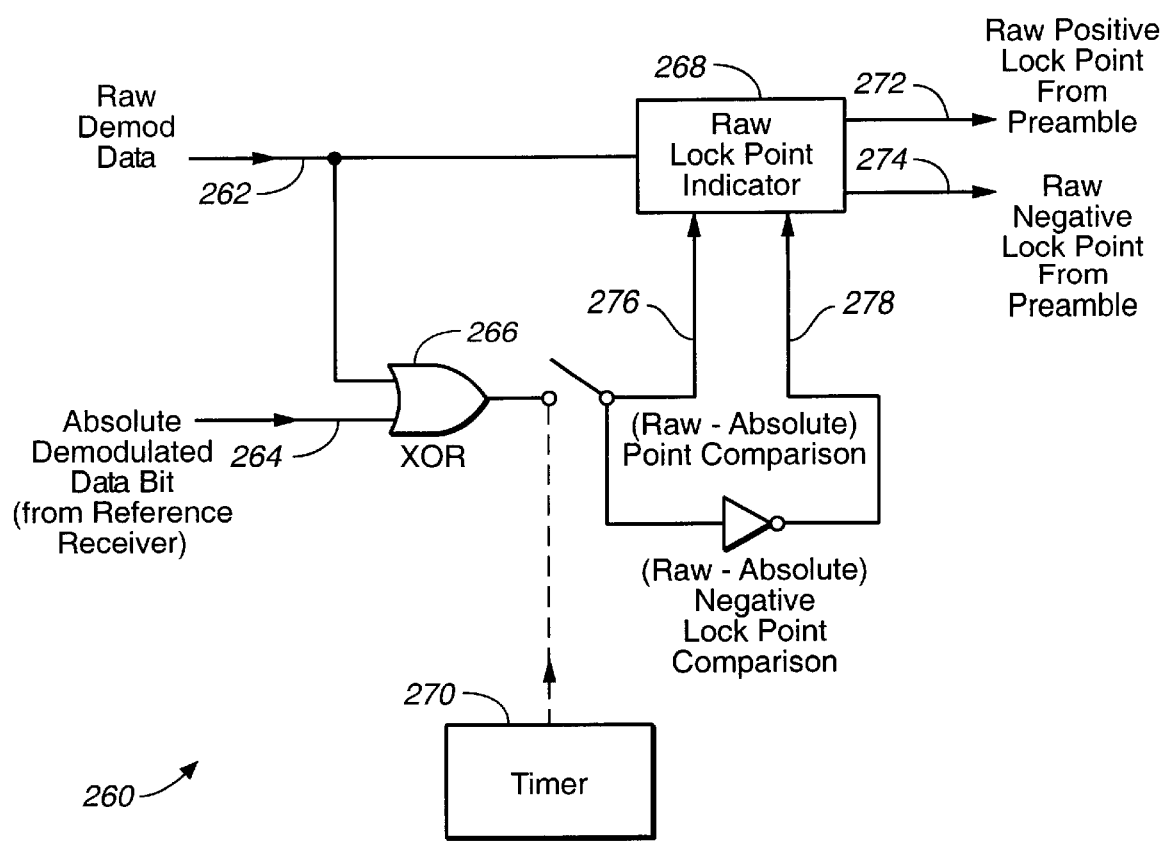
FIG._11

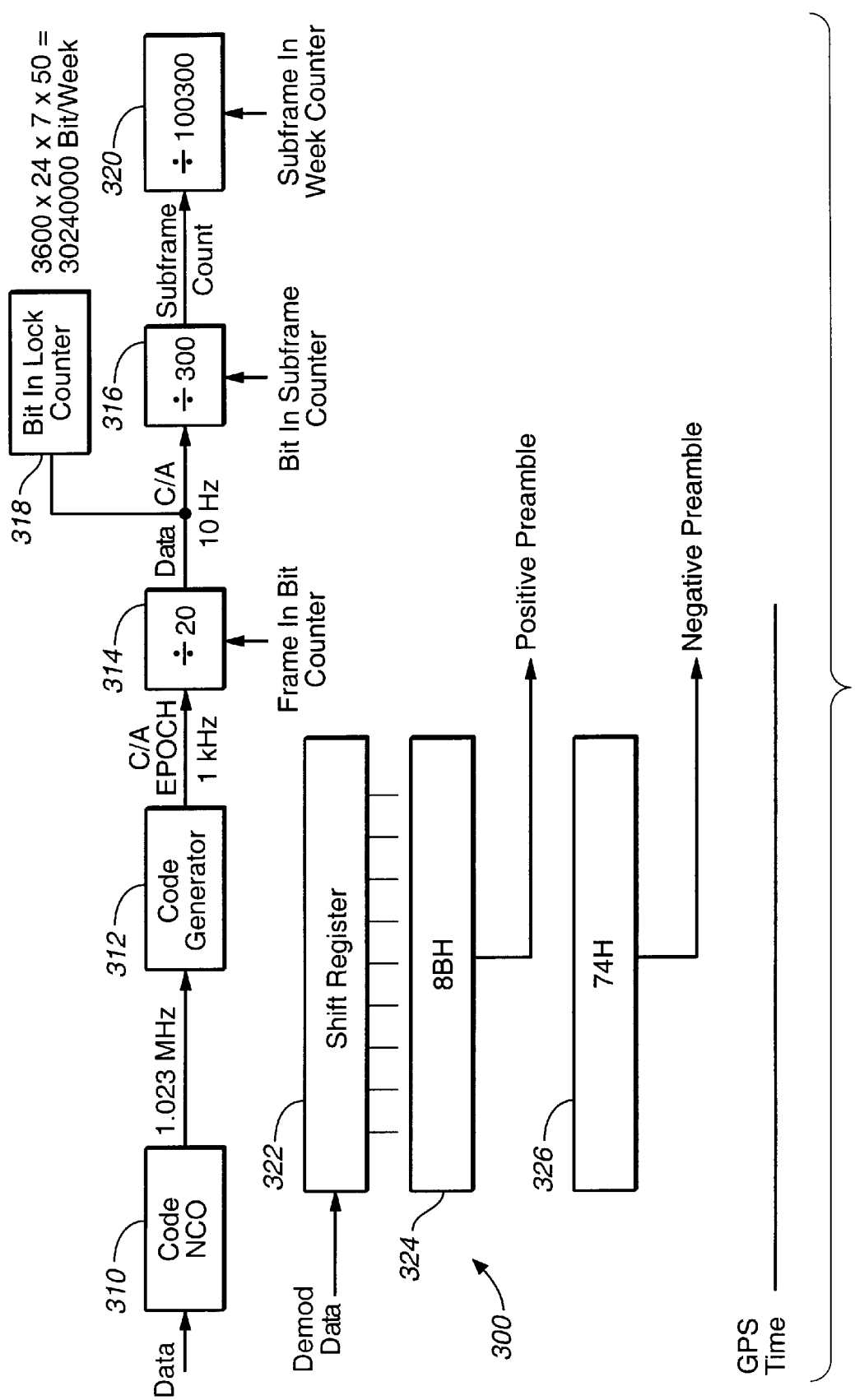
FIG._12

FAST RECOVERY OF LOCK POINT INFORMATION FOR GPS RTK RECEIVER

BACKGROUND

The invention relates to any GPS receiver, however, the primary application would be a centimeter accurate global positioning system (GPS) receiver for real-time kinematic (RTK) measurement. The satellite positioning system (SATPS) can include different satellite systems or combinations of the satellite systems. One of those systems is a global positioning system (GPS).

The GPS is a system of satellite signal transmitters, with receivers located on the Earth's surface or adjacent to the Earth's surface, that transmit information from which an observer's present location and/or the time of observation can be determined. There is also the Global Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code (or Y-code). The L2 signal from each satellite is BPSK modulated by only the P-code (or Y-code). The nature of these PRN codes is described below.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document GPS Interface Control Document ICD-GPS-200: GPS Interface Control Document, ARINC Research, 1998, GPS Joint Program Office, which is incorporated by reference herein.

A first unknown PRN code is Y-code. To prevent jamming signals from being accepted as actual satellite signals, the satellites are provided with a secret Y-code, which replaces the known P code when the "anti-spoofing" (AS) is ON. When the AS is OFF, the Y-code is turned OFF, and the known P-code (see above cited ICD-GPS-200) is used. Thus, the secret Y-code can be turned ON or OFF at will by the U. S. Government. The AS feature allows the GPS system to be used for the military or other classified United Government projects.

The C/A code is transmitted on L1 under all conditions as it is generally required to provide timing access to L1 and L2 P(Y) code. When AS is OFF, the known P code is transmitted on both L1 and L2, allowing authorized and unauthorized users alike access to full coded receiver operation on both L1 and L2 frequencies. As it is indicated above, when AS is ON, the known P code is replaced with a secret Y code on both L1 and L2.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, . . . 24) is the channel or satellite number. These frequencies lie in two bands at 1.597-1.617 GHz (L1) and 1,240-1,260 GHz (L2). The L1 code is modulated by a C/A- code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, to any other compatible satellite-based system, or combination of satellite systems that can provide information by which an observer's position and the time of observation can be determined, all of which meet the requirements of the present invention.

A Satellite Positioning System (SATPS), such as the Global Positioning System (GPS), the Global Navigation Satellite System (GLONASS), or the combination of GPS and GLONASS systems uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates ($x_0$, $y_0$, $z_0$) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187).

The following discussion is focused on a GPS receiver, though the same approach can be used for a GLONASS receiver, for a GPS/GLONASS combined receiver, or any other SATPS receiver.

When originally put into operation by the United States Government, the GPS was not intended to provide a civilian user with centimeter-level position accuracies. However, centimeter-level position accuracies are now required for such civilian applications as surveying, mapping, etc.

Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. As was stated above, GPS signal transmissions are on two synchronous, but separate carrier frequencies L1 and L2, with wavelengths of nineteen and twenty-four centimeters, respectively. Thus, within nineteen or twenty-four centimeters, the phase of the GPS carrier signal will change 360° degrees.

For the high accuracy positioning it is necessary to take into account not only the integer part of the carrier phase difference between two satellite receivers locked on the same satellite signal, but also the fractional part of the carrier phase difference.

Assuming that no cycle slip occurs, the integer part is constant, and one can measure only the fractional part of the carrier phase difference to achieve the high accuracy positioning.

However, if a cycle slip occurs, the lock point is lost. As a result, the constant integer number of the carrier phase difference between two satellite receivers locked onto the same satellite signal is also lost. If this is the case, the constant integer number of the carrier phase difference has to be re-established. In order to do that, the new lock point should be determined.

Thus, it is important to obtain the new lock point as soon as possible in order to quickly re-establish the constant integer number of the carrier phase difference between two satellite receivers locked on the same satellite signal.

In the prior art RTK GPS receiver the BPSK GPS signal has 2 distinct lock points that are separated by 180 degrees. The lock point can be identified by looking for the Preamble bit sequence that occurs every 6 seconds.

The RTK processor cannot make maximum use of the carrier phase measurement until the lock point is identified, or resolved. This means that following a cycle slip declaration (which could be caused by the branch of a tree, for example), the satellite measurements cannot be used in the RTK solution for up to 6 seconds.

Thus, in a tree bound applications, (for example, in forest surveying applications), the RTK GPS receiver is ineffective for up to 6 seconds following a single obscuration event.

What is needed is an improved RTK GPS receiver that incorporates a circuitry that allows a fast recovery of a lost lock point of a BPSK GPS signal.

SUMMARY

The present invention is novel and unique because it includes an improved RTK GPS receiver that allows a fast recovery of a lost lock point of a BPSK GPS signal by testing raw data bits against absolute data bits.

One aspect of the present invention is directed to a method of resolving the lock point ambiguity, wherein the method employs a rover satellite receiver (RSR).

In one embodiment, the method employing the RSR comprises the following steps: (a) locking on the carrier phase of a satellite signal received by the RSR and developing a demodulated data stream; (b) searching the data stream for a Preamble sequence using positive and negative logic pattern matches; wherein the Preamble sequence is a part of a telemetry word (TLM) and is transmitted from the satellite; (c) establishing a lock point by testing raw data bits against absolute data bits; (d) taking the carrier phase measurements; (e) correcting the carrier phase measurements by applying knowledge of the lock point; (f) marking the carrier phase measurements with the resolved lock point ambiguity as valid; and (g) using the valid carrier phase measurements in a variety of applications.

In one embodiment, the step (c) of establishing the lock point by testing raw data bits against absolute data bits further includes the step of testing polarity of a raw Preamble sequence data against a Preamble absolute sequence data.

In another embodiment, the step (c) of establishing the lock point by testing raw data bits against absolute data bits further includes the steps of: (c1) receiving an absolute demodulated data bit from a reference station satellite receiver (RSSR); (c2) comparing the absolute demodulated data bit transmitted from the RSSR against the corresponding raw demodulated data bit generated by a BPSK demodulator in the RSR and obtaining an absolute-raw demodulated data comparison; and (c3) utilizing the absolute-raw demodulated data comparison to drive a lock point indicator.

Another aspect of the present invention is directed to a method of resolving and transmitting an absolute data bit, wherein the method employs a reference station satellite receiver (RSSR).

In one embodiment, the method employing the RSSR comprises the following steps: (a) identifying a lock point of a phase-locked satellite signal by the RSSR; (b) inferring an absolute polarity of a satellite data bit by using its current estimate of the lock point; and (c) transmitting the absolute demodulation bit value to a rover satellite receiver (RSR).

In one embodiment, the step (b) of inferring the absolute polarity of the satellite data bit further includes the step of evaluating a Preamble absolute sequence data.

Another aspect of the present invention is directed to a method of resolving the lock point ambiguity, wherein the method employs both a rover satellite receiver (RSR) and a reference station satellite receiver (RSSR).

In one embodiment, the method employing both a rover satellite receiver (RSR) and a reference station satellite receiver (RSSR) comprises the following steps: (a) identifying a satellite absolute data bit by the RSSR; (b) locking and receiving a satellite raw data bit by the RSR; (c) synchronizing the absolute data bit and the raw data bit by utilizing the knowledge of absolute GPS time; (d) transmitting the absolute data bit from the RSSR to the RSR; and (e) determining the lock point of the RSR by comparing the absolute data bit and the raw data bit.

Yet, one more aspect of the present invention is directed to a system for resolving the satellite signal lock point ambiguity.

In one embodiment, the system comprises: a first satellite receiver ($SR_1$), a second satellite receiver ($SR_2$) and a communication link between the $SR_1$ and the $SR_2$.

In one embodiment, the second satellite receiver ($SR_2$) further comprises a lock point block for resolving the satellite signal lock point ambiguity. In this embodiment, the $SR_1$ transmits the absolute demodulated bit value to the $SR_2$ using the communication link, and the $SR_2$ utilizes the received absolute demodulated bit value to develop the satellite lock point.

The developed lock point is used to improve the navigational properties of a moving platform equipped with the RTK GPS of the present invention.

One additional aspect of the present invention is directed to a system for resolving the satellite signal lock point ambiguity.

In one embodiment, the system comprises: (1) a second satellite receiver ($SR_2$) and a communication link between a first satellite receiver ($SR_1$) and the $SR_2$.

In one embodiment, the second satellite receiver ($SR_2$) further comprises a lock point block for resolving the satellite signal lock point ambiguity. In this embodiment, the $SR_1$ transmits the absolute demodulated bit value to the $SR_2$ using the communication link, and the $SR_2$ utilizes the absolute demodulated bit value to determine the true sign of a lock point of demodulation data stream received by the $SR_2$.

Yet, one additional aspect of the present invention is directed to a system for resolving the satellite signal lock point ambiguity.

In one embodiment, the system comprises: a first satellite receiver ($SR_1$) and a communication link between the $SR_1$ and a second satellite receiver ($SR_2$).

In this embodiment, the $SR_1$ transmits the absolute demodulated bit value to the $SR_2$ using the communication link, and the $SR_2$ utilizes the absolute demodulated bit value to determine the true sign of a lock point of demodulation data stream received by the $SR_2$.

In one embodiment, the first satellite receiver ($SR_1$) further comprises a reference station satellite receiver (RSSR), and the second satellite receiver ($SR_2$) further comprises a rover satellite receiver (RSR).

BRIEF DESCRIPTION OF THE DRAWINGS

FIG. 1 depicts a single stable lock point of a regular phase-locked-loop (PLL) detector within ($0/2\pi$) interval.

FIG. 2 illustrates two stable lock points of the Costas detector within ($0/2\pi$) interval, that exhibits ($0\pi$) lock point ambiguity.

FIG. 3 shows the circuitry of the Costas loop detector.

FIG. 4 depicts a bit timing subsystem and digital decoder.

FIG. 5 shows a configuration of a TLM word.

FIG. 6 illustrates a system of the present invention including a rover satellite receiver, a reference station receiver and a communication link.

FIG. 7 depicts the front end of the RTK GPS receiver.

FIG. 8 illustrates the carrier channel baseband processing circuit of the RTK GPS receiver that includes the Costas loop.

FIG. 9 is a flow chart of a method of the present invention.

FIG. 10 depicts a prior art block for lock point identification.

FIG. 11 shows a lock point indicator block.

FIG. 12 illustrates a block diagram that identifies counters that are used to identify the GPS time in the week.

FULL DESCRIPTION OF THE PREFERRED EMBODIMENTS

Prior to receiving and processing any data from a GPS satellite, an RTK GPS receiver should perform frequency acquisition and synchronization of the satellite signal. The frequency acquisition and synchronization of the satellite signal is required when communication with the GPS satellite first begins due to the fact that frequency instabilities and Doppler effects during satellite signal propagation may prevent knowledge of the exact RF satellite signal frequency location. Frequency acquisition is performed by internally generating a local frequency identical to, or a fixed distance away from, the actual frequency of the received carrier frequency. Frequency tracking is an operation of continuously maintaining this local frequency in synchronism with the received frequency.

In addition to the frequency acquisition, an RTK GPS receiver, being a digital phase coherent system, has an additional requirement for bit and word timing, and for phase referencing. The bit and word timing is generally provided by the RTK GPS receiver's bit clock synchronized to the data.

By phase referencing we refer to the general operation of providing a local carrier frequency in exact or almost exact, phase synchronization with a received carrier at the same frequency. Ultimately, the design of the phase synchronization system determines the accuracy of the decoding performance of the RTK GPS receiver. In addition, the reference carrier is used for Doppler tracking, while the clock is used for establishing coherent timing between a rover satellite receiver (RSR) and a reference station satellite receiver (RSSR). See discussion below.

The RTK GPS receiver utilizes radio frequency—intermediate frequency (RF-IF) conversion. In such system it is necessary that the received and local carrier frequencies be within the IF bandwidth of each other. When the received carrier is phase modulated as a BPSK carrier, there is no carrier component to be tracked and carrier recovery cannot be obtained via a standard phase lock loop. Instead, a modified system should be used, which first uses a nonlinearity to eliminate the modulation while creating a carrier component having a phase variation proportional to that of the receiver carrier. Subsequent tracking of the residual carrier component then generates the desired carrier reference.

The standard prior architecture of the RTK GPS satellite receiver utilizes the Costas, or quadrature loop (60), as depicted in FIG. 3, to achieve suppressed carrier synchronization. The Costas loop includes two parallel tracking loops operating simultaneously from the same voltage controlled oscillator (VCO) (66). One loop, called the in-phase loop, uses the VCO (66) directly for tracking, and the second, quadrature loop, uses a 90° shifted VCO. The mixer (70) outputs are each multiplied, filtered by the Loop filter (68), and used to control the VCO (66). The low pass filters (64) and (76) are designed to integrate the carrier signal over the 20 msec data bit.

After the data modulated carrier has been demodulated to baseband via the coherent carrier reference, bit timing should be established to clock the bit or word decoding. The bit timing subsystem and digital decoder (90) are depicted in FIG. 4. Bit timing therefore corresponds to the operation of extracting from the demodulated baseband waveform (92) a time coherent clock at the bit rate or word rate of the data. Bit timing subsystems (96) generally operate in conjunction with the decoder (94), and use the same demodulated baseband waveform to extract the bit timing clock. Timing markers (99) provided from this clock then can be used to synchronize the decoder (94).

One way to achieve code timing from a modulated waveform (that is used in an actual RTK GPS receiver) is to utilize an (Early-Late) code detector.

The information used to close the code tracking loop and to determine the exact tracking point is taken from an Early (E) autocorrelation function and Late (L) autocorrelation function. These two correlation functions are used to build an (Early minus Late) correlation function that yields the tracking point.

The present invention allows one to resolve the lock point ambiguity for any carrier tracking loop that exhibits (0°/180°) phase detector ambiguity.

In one embodiment, the RTK GPS receiver of the present invention utilizes the third order Costas carrier tracking loop.

In one embodiment of the Costas loop (60), as shown in FIG. 3, the received BPSK carrier signal (61) is $2A(t) \cos(\theta_i)$, wherein $A=A(t)=(+/-)$ amplitude of the BPSK data signal having frequency of 50 Hz, and wherein $\theta_i$ is an input phase. The signal (61) is multiplied in the mixer (62) with the output signal (63) from the voltage controlled oscillator VCO (66) and is multiplied in the mixer (74) with the output signal (73) $\cos(\theta_0)$ from the shifter (72). The mixed signal (65) $(-) A(t) [\sin(\theta_i-\theta_0)-\sin(\theta_0+\theta_0)]$ is integrated in the (integrate & dump) circuit (64) over 20 msec data bit which outputs signal (78) $(-) A(t) \sin(\theta_i-\theta_0)$. The mixed signal (75) $A(t) [\cos(\theta_i-\theta_0)+\cos(\theta_0+\theta_0)]$ is integrated in the (integrate & dump) circuit (76) over 20 msec data bit which outputs signal (80) $A(t) \cos(\theta_i-\theta_0)$.

The signal $A(t)=(+/-)$ amplitude of the BPSK data signal having frequency of 50 Hz, and wherein $\theta_i$ is an input phase), is data stripped in the mixer (70) that removes the sign of the A signal. Indeed, the mixed signal (69) can be written as follows: $[A^2(t) \sin(2(\theta_i-\theta_0))]/2$.

FIG. 1 depicts a curve (10) of the regular phase-locked-loop (PLL) detector within $(0/2\pi)$ interval having a single stable lock point (12).

On the other hand, the output signal (69) $[A^2(t) \sin(2(\theta_i-\theta_0))]/2$ of the Costas loop (60 of FIG. 3) is shown in FIG. 2 as curve (30). The curve (30) of FIG. 2 clearly illustrates two stable lock points (32) and (36) of the Costas detector within $(0/2\pi)$ interval. Thus, the Costas detector exhibits $(0/\pi)$ lock point ambiguity.

As shown in FIG. 5, each telemetry word (TLM) (120) is 30 bits long, occurs every six seconds in the data frame, and is the first word in each subframe/page. Bit 1 is transmitted first. Each TLM word begins with a Preamble (122), followed by the TLM message (121), two reserved bits, and six parity bits (123).

For GPS transmission, the last bit of the preceding word is XOR-ed with all 24 bits of the current word as a part of a differential phase shift key (DPSK) operation. In the special case of the TLM word, the last bit of the previous word is arranged to be always 0, which means that the Preamble bit values are known absolutely. This allows the resolution of the Costas loop lock point ambiguity. Indeed, for the 0° lock point the Preamble is positive, and for the 180° lock point the Preamble is negative. Thus, in the carrier phase processing, for the 0° lock point no action is needed, and to compensate for the 180° lock point it is sufficient to add or subtract ½ cycle.

However, the prior art solution to the lock ambiguity problem creates another problem. Indeed, if the lock to the satellite is lost (for example, because the view of the sky became obstructed by the tree environment), the RTK GPS receiver has to wait for the next Preamble to occur, that is up to six seconds, to be able to resolve the lock point ambiguity in real time.

To deal with this problem, in one embodiment, the present invention employs a system (125) of FIG. 6. The system (125) includes a first satellite receiver $SR_1$ (126), a second satellite receiver $SR_2$ (127), and a communication link (128).

In one embodiment, the first satellite receiver $SR_1$ (126) includes a rover satellite receiver (RSR), and the second satellite receiver $SR_2$ (127) includes a reference station satellite receiver (RSSR).

The reference station satellite receiver (RSSR) (127) is generally located at a permanent location with unobstructed view of the sky, as opposed to the rover satellite receiver (RSR) (125) whose view of the sky can become obstructed, for example by the tree environment. Thus, the RSSR receiver is able to resolve the lock point ambiguity at all times and can periodically transmit the absolute data bit being received from each satellite to the RSR (125) using the communication link (128) as a part of the message transmitted by the reference station. By comparing the received bit with the absolute reference bit, the RSR(125) can determine if it is tracking at the 0° lock point or at the 180° lock point immediately and does not have to wait six seconds until the next TLM word is received.

The communication link (128) can be implemented using a variety of different embodiments.

In general, the communication link can employ a radio-wave frequency band, an infrared frequency band, or a microwave frequency band.

In one embodiment, the communication link can include the ISM (industrial scientific medical) unlicensed operation band, including 900 MHz, 2.4 GHz, or 5.8 GHz bands, wherein the user can own both ends of the ISM communication system. The ISM technologies are manufactured by Trimble Navigation Limited, Sunnyvale, Calif., Metricom, Los Gatos, Calif., and by Utilicom, Santa Barbara, Calif.

In another embodiment, the communication link can employ a 1.8 GHz band that supports the personal communications services (PCS). The PCS uses the international standard DCS-1800.

In yet one more embodiment, the communication link can include a real time circuit switched communication link. For instance, the communication link employing a real time circuit switched communication link can include the Iridium satellite system produced by Motorola, Schaumburg, Ill.

In one additional embodiment, the communication link can employ a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20–30) GHz range are manufactured by Cellular Communications located in Redmond, Washington, and the LEOS systems in (1.6–2.5) GHz range are produced by Loral/Qualcomm located in San Diego, Calif.

The communication link can also include a cellular telephone communication means, a paging signal receiving means, wireless messaging services, wireless application services, a wireless WAN/LAN station, or an Earth-satellite-Earth communication module that uses at least one satellite to relay a radiowave signal.

The communication link can also include the cellular telephone communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

FIG. 9 illustrates a flow chart (210) of a method of the present invention for resolving the lock point ambiguity.

In one embodiment, the method (210) employs a rover satellite receiver (RSR) and comprises the following steps.

In the first step (212 of FIG. 9), the RSR is locked onto the carrier phase of a satellite signal and a demodulated data stream is developed.

FIG. 7 depicts the front end (130) of a single frequency rover GPS receiver. In the case of the dual frequency GPS receiver, the circuit of FIG. 7 should be replicated to do both L1 and L2 processing simultaneously.

In the preferred embodiment, the front end of the GPS receiver circuit (130) further includes: (1) an Antenna (132) configured to receive $L1_{GPS}$ signal; (2) a Filter/LNA circuit (134) configured to perform the filtering and low noise amplification of $L1_{GPS}$ signal; (3) a Downconverter circuit (140) configured to convert down in frequency $L1_{GPS}$ signal; and (4) an IF processor (144, 146, 164, 168) configured for further frequency translating and digitizing $L1_{GPS}$ signal.

FIG. 8 depicts the carrier channel baseband processing circuit (180) of the GPS receiver that includes the Costas loop discussed above.

In one embodiment, the carrier channel baseband processing circuit (180) of the GPS receiver further comprises: (1) carrier mixer (182) configured to further frequency translate the I (150) and Q (170) components of the incoming satellite signals to d. c. carrier frequency (0 Hz carrier frequency) I (183) and Q (185) components of the incoming satellite signals; (2) a carrier numerically controlled oscillator (NCO) (200) configured to close the carrier tracking loop via the control of the Microprocessor system µP (not shown); (3) code mixer circuits (184 and 186) configured to mix the d. c. I (183) and Q (185) carrier components of the incoming satellite signals with the locally generated code $L_c$ signals (187) at three time points Early (E), Punctual (P), and Late (L) on the autocorrelation function formed between the satellite code and local code; (4) a code generator (192) configured to generate the code signals $L_C$; (5) a code NCO (not shown) configured to drive the code generator; and (6) correlators blocks (188 and 190) configured to integrate the signals outputted by the code mixer over an integer number of C/A signals periods. Each C/A period is marked by a C/A Epoch.

Thus, the carrier tracking channel (180 of FIG. 8) achieves carrier phase lock of the received signal when the frequency and the phase of the carrier NCO circuit (200) matches that of the received signal that has been down converted to base band.

The circuit (180) includes the phase lock loop (PLL), or Costas loop that drives the mean power in the Q correlator (190) position to 0. This means that the Q channel (185, 186, 190, 196) is (+/−) 90° out of phase with the downconverted signal and that the I channel (150, 182, 183, 184, 188, 194) is (0°/180°) out of phase with the downconverted signal. The data strip multiplier (196) causes the 180° ambiguity.

The next step (214 of FIG. 9) is step (b) of searching the data stream for a Preamble sequence using positive and negative logic pattern matches; wherein the Preamble sequence is a part of a TLM word and is transmitted from the satellite being locked every six seconds. Once the Preamble sequence has been identified the data stream is frame locked.

The prior art block (230) for lock point identification is shown in FIG. 10. The lock point is known when the (0°/180°) ambiguity has been resolved. In prior art block (230) the method used to resolve the lock is based on determining whether the first 8 bits that comprise the Preamble of the TLM word are received in positive logic (244) or negative logic sense (246). The positive logic value for these 8 bits is determined in the 8BH (Hexadecimal) block (234). The negative logic value for these 8 bits is determined in the complement of 8BH (Hexadecimal), that is in the 74H block (238). The output of the shift register (236) is simultaneously applied to the positive logic block (234) and to the negative logic block (238) to determine (0°/180°) ambiguity. Lock point events are separated by 300 data bits.

The next step (216 of FIG. 9) is step (c) of establishing a lock point by testing raw data bits against absolute data bits.

The absolute data bits can be found in the Preamble sequence, because it is guaranteed to be transmitted from the satellite using positive logic.

In one embodiment, the absolute data bit is determined by the RSSR (127 of FIG. 6) and transmitted to the RSR (126 of FIG. 6) using the communication link (128 of FIG. 6).

In another embodiment, the absolute data bit is received by the RSR (126 of FIG. 6) from a source of absolute data bits, wherein the source of absolute data bits is not specified.

The next step (218 of FIG. 9) is step (d) of taking the carrier phase measurements. Taking a sample of the carrier NCO (200 of FIG. 8) phase at the measurement time forms the instantaneous carrier phase measurement. In most instances this is a fractional phase measurement in the range of 0 to 360 degrees. In general this occurs on all channels at once. The fractional phase measurement is extended into an integer/fractional phase measurement by calculating or counting the number of whole cycles produced by the carrier NCO.

The next step (220 of FIG. 9) is step (e) of correcting the carrier phase measurements by applying knowledge of the lock point. See discussion below.

The final step (222 of FIG. 9) is step (f) of marking the carrier phase measurements with the resolved lock point ambiguity as valid.

The integer/fractional phase measurement is then adjusted for the (0°/180°) ambiguity inherent in the BPSK PLL demodulator. The correction is arbitrary. For instance, for positive lock point add 0°, for negative lock point add 180°.

The valid carrier phase measurements are used in a variety of applications.

A typical application is that of RTK. In the RTK system, the reference carrier phase measurements are transmitted at a regular interval to one or many roving receivers. The rover receiver uses the phase measurements made by both the reference and the rover to calculate the baseline distance from the reference station to the rover.

A cycle slip occurs when the GPS receiver loses phase lock for a short period of time. The vast majority of cycle slips occur on the rover receiver RSR and not on the reference receiver RSSR. This is because the reference is usually located in a static position with a good view of the sky.

If cycle slip occurs the previous steps (212–216 of FIG. 9) should occur again before the RSR can again start making full cycle carrier phase measurements in the step (218 of FIG. 9).

The lock point should be resolved in both the rover and the reference station before useful RTK processing can resume. Since the TLM transmission period is six seconds, the lock point resolution might also take as long as six seconds.

In one embodiment, the step (216 of FIG. 9) (c) of establishing the lock point by testing raw data bits against absolute data bits further includes the step of testing polarity of a raw Preamble sequence data against a Preamble absolute sequence data.

In another embodiment, the step (216 of FIG. 9) (c) of establishing the lock point by testing raw data bits against absolute data bits further includes the following steps: (1) receiving an absolute demodulated data bit from a reference station satellite receiver (RSSR); (2) comparing the absolute demodulated data bit transmitted from the RSSR against a corresponding raw demodulated data bit generated by a BPSK demodulator in the RSR and obtaining an absolute-raw demodulated data comparison; and (3) utilizing the absolute-raw demodulated data comparison to drive a lock point indicator.

Thus, in this embodiment the proposed solution is to use the fact that the reference station rarely undergoes a cycle slip. Once the reference station has identified the lock point of phase locked signal, it can then infer the absolute polarity of any data bit. Clearly, if the reference station tracking channel cycle slips, then it will have to wait until the next TLM word occurs before it can resolve the lock point. This is of little consequence, because it happens so infrequently on the reference station.

In one embodiment, the reference station transmits the absolute demodulated data bit value at a frequency that is higher than the TLM repetition rate, which is every six seconds. A practical transmission rate might be once per second or whenever the reference station produces a set of carrier phase measurements for the rover to use. The reference receiver determines the absolute data bit value using its current estimate of lock point. If the loci point is positive, then a demodulated value of 1 is absolutely a 1; conversely, if the lock point is negative then a demodulated value of 1 is absolutely a 0. This assignment is arbitrary.

By comparing the absolute data bit value obtained from the reference station, the rover can determine its lock point independently of the TLM word. If the rover's demodulated data bit matches the absolute bit generated by the reference receiver channel, then the rover channel has a positive lock point. Conversely, if a demodulated data bit has the opposite sign to the reference absolute data bit, then the lock point is negative.

FIG. 11 depicts a lock point indicator block (260) comprising an XOR gate (266) configured to compare a raw demodulated data bit (262) received by a rover BPSK block and an absolute data bit (264) received from the reference station.

In one embodiment, the RSR includes the lock point indicator block (260 of FIG. 11).

The lock point indicator block (260) also includes a timer block (270) configured to synchronize the absolute data bit (264) received from the reference station and the raw data bit (262) received from the rover BPSK block. A lock point indicator (268) is configured to indicate a true raw value of an identified lock point.

The absolute-raw demodulated comparison data (276 and 278) is utilized to drive the lock point indicator (268).

FIG. 12 depicts a block diagram (300) that includes counters that are used to identify the GPS time in the week. These counters are common to both reference and rover receivers and allow any arbitrary bit to be referenced as part of an algorithm. For example, one can choose to send data every 50-th data bit in the week (once per second).

The Epoch bit counter (314) is set by detecting the 20 msec data bit edge. The bit in subframe counter (316) is set by identifying the position of the Preamble sequence.

The subframe in week counter (320) is identified from the Z-count field of the HOW word (Z- count) at each subframe. The positive Preamble (324) and the negative Preamble (326) signals are used to synchronize Mod 300 bit in subframe counter (316).

Thus, referring back to FIG. 4, the timing subsystem (96) is implemented in the RSR by using the Epoch bit counter (314), the subframe counter (316), and the week counter (320).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of resolving the lock point ambiguity, said method employing a rover satellite receiver (RSR), said method comprising the steps of:

(a) locking on the carrier phase of a satellite signal received by said RSR and developing a demodulated data stream;

(b) searching the data stream for a Preamble sequence using positive and negative logic pattern matches; wherein said Preamble sequence is a part of a TLM word and is transmitted from the satellite;

(c) establishing a lock point by testing raw data bits against known absolute data bits;

(d) taking the carrier phase measurements;

(e) correcting the carrier phase measurements by applying knowledge of said lock point; and (f) marking the carrier phase measurements with the resolved lock point ambiguity as valid.

2. The method of claim 1, wherein said step (c) of establishing said lock point by testing raw data bits against absolute data bits further includes the step of:

testing polarity of a raw Preamble sequence data against a Preamble absolute sequence data.

3. The method of claim 1, wherein said step (c) of establishing said lock point by testing raw data bits against absolute data bits further includes the steps of:

receiving an absolute demodulated data bit from a reference station satellite receiver (RSSR);

comparing said absolute demodulated data bit transmitted from said RSSR against a corresponding raw demodulated data bit generated by a BPSK demodulator in said RSR and obtaining an absolute-raw demodulated data comparison; and utilizing said absolute-raw demodulated data comparison to drive a lock point indicator.

4. A method of resolving and transmitting an absolute data bit, said method employing a reference station satellite receiver (RSSR), said method comprising the steps of:

identifying a lock point of a phase locked satellite signal by said RSSR;

inferring an absolute polarity of a satellite data bit by using its current estimate of said lock point; and transmitting said absolute demodulation bit value of said lock point to a rover satellite receiver (RSR).

5. The method of claim 4, wherein said step of inferring said absolute polarity of said satellite data bit further includes the step of:

evaluating a Preamble absolute sequence data.

6. A method of resolving the lock point ambiguity, said method employing a rover satellite receiver (RSR) and a reference station satellite receiver (RSSR); said method comprising the steps of:

(a) identifying a satellite absolute data bit by said RSSR;

(b) locking and receiving a satellite raw data bit by said RSR;

(c) synchronizing said absolute data bit and said raw data bit by utilizing the knowledge of absolute GPS time;

(d) transmitting said absolute -data bit from said RSSR to said RSR; and (e) determining the lock point of said RSR by comparing said absolute data bit and said raw data bit.

7. A system for resolving the satellite signal lock point ambiguity, said system comprising:

a first satellite receiver ($SR_1$) further comprising:

a second satellite receiver ($SR_1$) further comprising:

a lock point block for resolving the satellite signal lock point ambiguity; and a communication link between said $SR_1$ and said $SR_2$;

wherein said $SR_1$ transmits the absolute demodulated bit value to said $SR_2$ using said communication link; and wherein said $SR_2$ utilizes said absolute demodulated bit value to develop said satellite lock point.

8. The system of claim 7;

wherein said first satellite receiver ($SR_1$) further comprises:

a reference station satellite receiver (RSSR);

and said second satellite receiver ($SR_2$) further comprises:

a rover satellite receiver (RSR).

9. The system of claim 8, wherein said lock point block for resolving the satellite signal lock point ambiguity further comprises:

an XOR gate configured to compare a demodulated data bit received by a rover BPSK block and an absolute data bit received from said RSSR;

a timer block configured to synchronize said absolute data bit received from said RSSR and said raw data bit received from said rover BPSK block; and a lock point indicator configured to indicate a true value of an identified lock point;

wherein said absolute-raw demodulated data comparison is utilized to drive said lock point indicator.

10. A system for resolving the satellite signal lock point ambiguity, said system comprising:

a second satellite receiver ($SR_2$) further comprising:

a lock point block for resolving the satellite signal lock point ambiguity; and a communication link between a first satellite receiver ($SR_1$) and said $SR_2$;

wherein said $SR_1$ transmits the absolute demodulated bit value to said $SR_2$ using said communication link;

land wherein said $SR_2$ utilizes said absolute demodulated bit value to determine the true sign of a lock point of demodulation data stream received by said $SR_2$.

11. The system of claim 10;

wherein said first satellite receiver ($SR_1$) further comprises:

a reference station satellite receiver (RSSR);

and wherein said second satellite receiver ($SR_1$) further comprises:

a rover satellite receiver (RSR).

12. A system for resolving the satellite signal lock point ambiguity, said system comprising:

a first satellite receiver ($SR_1$); and a communication link between said $SR_1$ and a second satellite receiver ($SR_2$);

wherein said $SR_1$ transmits the absolute demodulated bit value to said $SR_2$ using said communication link;

and wherein said $SR_2$ utilizes said absolute demodulated bit value to determine the true sign of a lock point of demodulation data stream received by said $SR_2$.

13. The system of claim 12;

wherein said first satellite receiver ($SR_1$) further comprises:

a reference station satellite receiver (RSSR);

and said second satellite receiver ($SR_2$) further comprises:

a rover satellite receiver (RSR).

* * * * *